US010742757B2

(12) United States Patent
Goenka et al.

(10) Patent No.: US 10,742,757 B2
(45) Date of Patent: Aug. 11, 2020

(54) AUTOMATED NETWORK ACCOUNT TRANSFERS BASED ON DETERMINED INACTIVITY

(71) Applicant: OATH INC., New York, NY (US)

(72) Inventors: Mohit Goenka, Santa Clara, CA (US); Ashish Khushal Dharamshi, Sunnyvale, CA (US); Nikita Varma, Milpitas, CA (US)

(73) Assignee: OATH INC., New York, NY (US)

( * ) Notice: Subject to any disclaimer, the term of this patent is extended or adjusted under 35 U.S.C. 154(b) by 218 days.

(21) Appl. No.: 15/834,268

(22) Filed: Dec. 7, 2017

(65) Prior Publication Data

US 2019/0182342 A1    Jun. 13, 2019

(51) Int. Cl.
*H04L 29/08* (2006.01)
*G06Q 50/00* (2012.01)
(Continued)

(52) U.S. Cl.
CPC .......... *H04L 67/22* (2013.01); *G06F 16/9024* (2019.01); *G06F 16/90335* (2019.01);
(Continued)

(58) Field of Classification Search
CPC ....... H04L 67/22; H04L 63/083; H04L 51/14; H04L 67/306; H04L 51/32; G06Q 50/01;
(Continued)

(56) References Cited

U.S. PATENT DOCUMENTS

2012/0016803 A1* 1/2012 Tharp .................... G06Q 10/10
705/319
2014/0337059 A1* 11/2014 Simon .................. G06Q 50/186
705/4

(Continued)

*Primary Examiner* — Philip J Chea
*Assistant Examiner* — Mohammed Ahmed
(74) *Attorney, Agent, or Firm* — James J. DeCarlo; Greenberg Traurig, LLP

(57) ABSTRACT

Systems, devices, and methods for automating network account transfers based on predicted inactivity are disclosed. In one embodiment, the system comprises a mail server providing access to an email account of a user; a social graph monitor configured to: periodically query, over a network, a social graph associated with the user to retrieve at least one social network feed associated with the user, calculate a sentiment score for the social network feed based on parsing the social network feed using a natural language parser, and determining that a transfer condition has occurred if the sentiment score exceeds a pre-defined sentiment score threshold; and a condition processor configured to: transmit, via the mail server, a password reset request to a network application associated with the transfer condition, intercept an email from the network application, via the mail server, transmitted in response to the password reset request, forward, via the mail server, the email to a recipient associated with the transfer condition, determine that the recipient has reset a password associated with the network application, and forward, to the recipient via the mail server, subsequent emails from the network application.

20 Claims, 10 Drawing Sheets

(51) Int. Cl.
| | |
|---|---|
| *H04L 29/06* | (2006.01) |
| *H04L 12/58* | (2006.01) |
| *G06N 3/08* | (2006.01) |
| *G06F 16/951* | (2019.01) |
| *G06F 16/901* | (2019.01) |
| *G06F 16/903* | (2019.01) |
| *G06F 40/30* | (2020.01) |
| *G06F 40/205* | (2020.01) |

(52) U.S. Cl.
CPC .......... *G06F 16/951* (2019.01); *G06F 40/205* (2020.01); *G06F 40/30* (2020.01); *G06N 3/08* (2013.01); *G06Q 50/01* (2013.01); *H04L 51/14* (2013.01); *H04L 51/32* (2013.01); *H04L 63/083* (2013.01); *H04L 67/306* (2013.01)

(58) Field of Classification Search
CPC ............... G06F 17/2785; G06F 16/951; G06F 17/2705; G06N 3/08
See application file for complete search history.

(56) References Cited

U.S. PATENT DOCUMENTS

| | | | |
|---|---|---|---|
| 2016/0337288 A1* | 11/2016 | Childress | ................ H04L 67/22 |
| 2018/0091521 A1* | 3/2018 | Pachouri | ............... H04L 63/102 |
| 2018/0253163 A1* | 9/2018 | Berger, Jr. | .......... G06F 3/03545 |

\* cited by examiner

AUTOMATED NETWORK ACCOUNT TRANSFERS BASED ON DETERMINED INACTIVITY

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever

BACKGROUND

Technical Field

The disclosed embodiments describe network computing systems and systems, devices, and methods for automatic network account migration based on predicted inactivity of a user.

Description of the Related Art

Currently, users are subscribing to more and more networked systems. A single user may have email accounts, social media accounts, photo sharing accounts, cloud storage accounts, online banking accounts, accounts with professional and hobby groups, and a plethora of other account types. With the worldwide increase in digital activity becoming an increasingly pervasive aspect of user's lives, digital accounts have begun to be equal in importance to the traditional property of a user. Thus, users are becoming more concerned with what happens to these network accounts in the event of death or significant periods of inactivity.

Various systems have attempted to remedy this concern in a variety of technical ways. Certain social networks, for example, allow users to provide instructions on how their public facing account should be "memorialized" in the event of death. Users may notify the company if a person is deceased triggering the conversion of the profile to a memorialized profile. Alternatively, some webmail providers provide an "inactive account manager" which monitors a user's account activity (e.g., sign-ins, emails sent, etc.). If the manager detects that a user's activity falls below a threshold level of activity (currently, 3, 6, 12, or 18 months), the system notifies a recipient user and provides access to a "bulk download" of the user's profile data to the recipient user.

These systems have numerous deficiencies. First, the system used by social networks requires manual interactions and simply converts a page to a memorialized page. At no point is the actual data transferred to another user like an inheritance. The system used by webmail providers, while a technical improvement, suffers from numerous technical deficiencies.

First, the system used by webmail providers relies upon an inaccurate monitoring solution that merely monitors interactions with the system itself. For example, a user may set an inactivity window of three months and may not use their email account for three months (but may continue to use social media accounts, etc.). Despite being active on other platforms, the system used by webmail providers would identify a user as inactive (or, worse, deceased) and trigger the transfer of account details. Thus, the system used by webmail providers necessarily has a high-rate of false positives and results in the inadvertent leakage of user data.

Second, the system used by webmail providers does not transfer control of accounts to other users; rather it simply transmits an archive of raw data. Third, the system used by webmail providers has no way to interact with third-party accounts and only provides access to internal application data.

The disclosed embodiments describe systems, devices, and method that remedy these problems, as briefly described below.

SUMMARY

The disclosed embodiments describe a technical solution for solving the current technical limitations of network applications that host user data. Specifically, the disclosed embodiments first describe a social graph monitor that periodically extracts social media data associated with a given user. The system processes these posts using an NLP sentiment analysis routine to detect a sentiment associated with the posts. The system then determines if this sentiment triggers a transfer condition. The proposed solution of using NLP sentiment analysis combined with social media remedies the problems in existing solutions where inactivity (which may be unintentional) prematurely or inaccurately triggers account deactivation routines.

In addition to improving systems for detecting transfer conditions, such as the death of a user, the disclosed embodiments describe a fine-grained condition engine that can perform a variety of account transfer operations based on user-defined rules. These operations utilize external APIs of network applications in combination with internal segmenting logic to automatically bundle network application assets for delivery to identified recipients. Current systems lack this segmenting ability and rely primarily on "data dumps" of all account information. Further, the system allows for the complete control of network applications by intercepting and forwarding password reset emails, an operation currently not performed by existing systems.

As described in more detail, these and other solutions remedy the deficiencies in the previously discussed systems and enable a user's "digital legacy" to be finely controlled and redistributed in response to a transfer condition such as the death of the user.

BRIEF DESCRIPTION OF THE FIGURES

The preceding and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
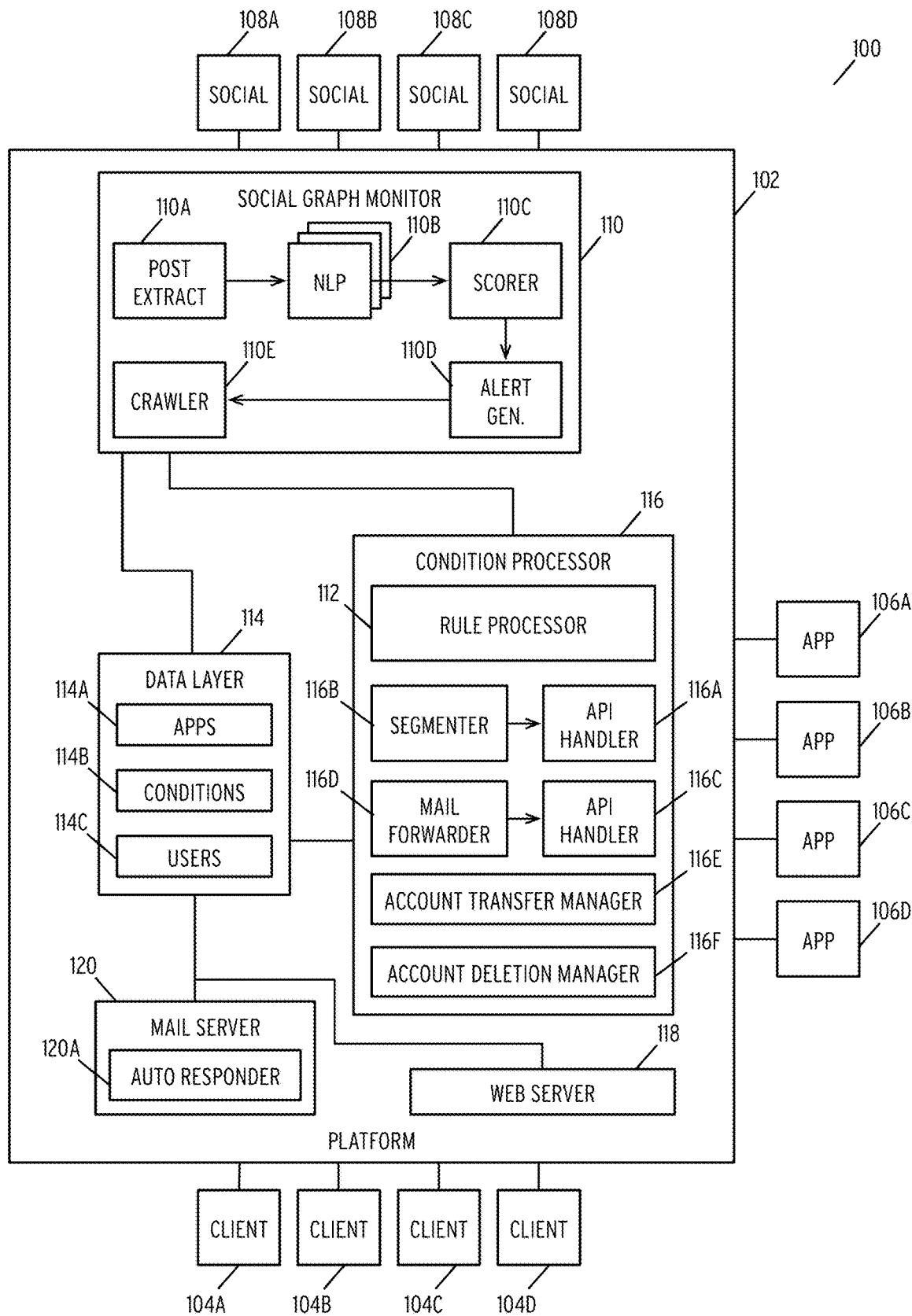
FIG. 1 is a system diagram illustrating a system for automating network account transfers based on predicted inactivity according to some embodiments of the disclosure.

The present disclosure will now be described more fully in the descriptions of the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. Also, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. Also, the term "based on" may be understood as not necessarily intended to convey an exclusive set of factors and may, instead, allow for the existence of additional factors not necessarily expressly described, again, depending at least in part on context.

The present disclosure is described below in the descriptions of block diagrams and operational illustrations of methods and devices. Each block of the block diagrams or operational illustrations, and combinations of blocks in the block diagrams or operational illustrations can be implemented using analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For this disclosure a computer readable medium (or computer-readable storage medium/media) stores computer data, which data can include computer program code (or computer-executable instructions) that is executable by a computer, in machine-readable form. By way of example, and not limitation, a computer readable medium may comprise computer-readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

FIG. 1 is a system diagram illustrating a system for automating network account transfers based on predicted inactivity according to some embodiments of the disclosure.

In the illustrated system (100), a plurality of client devices (104A-104D), social networking applications (108A-108D), and network applications (106A-106D) are communicatively coupled to a service platform (102). In one embodiment, each of these devices (104A-104D, 106A-106D, and 108A-108D) are connected to platform (102) via a wide area network such as the Internet.

In one embodiment, a client device (104A-104D) comprises a computing device operated by a user. This device may be a portable computing device (e.g., mobile phone, tablet, etc.) or a desktop computing device (e.g., a desktop computer or laptop device). Network applications (106A-106D) may comprise any networked application device (e.g., a combination of servers, databases, etc.) that provide network services to client devices (104A-104D). Although not illustrated, client devices (104A-104D) communicate directly with network applications (106A-106D) to perform network operations, retrieve and upload data, and perform any network interactions with the remote computing services. Social networks (108A-108D) may comprise any type of social application (e.g., FACEBOOK, TWITTER, LINKEDIN, etc.). In general, social networks (108A-108D) comprise any network service that allows users to post content (e.g., on a "wall" of a user operating a client device).

Although illustrated as a single device, platform (102) may comprise a virtual private cloud hosting multiple servers (either physically or virtually). In some embodiments, each major component (110, 112, 114, 116, 118, and 120) may comprise one or more physical servers or virtual machines. In some embodiments, each of these major components may be automatically scaled (e.g., by instantiating a new virtual machine) as needed.

As illustrated, platform (102) includes a data layer (114) that stores all information needed for the operation of the various components of the platform (102). In some embodiments, data layer (114) may be a data lake or big data storage cloud for managing all data needed for the operation of the system. Alternatively, or in conjunction with the foregoing, the data layer (114) may include one or more relational databases for storing the necessary information. In some embodiments, the data layer (114) includes multiple, discrete data storage mechanisms chosen based on the type of data. For example, data regarding users (114C) may be stored in a relational database to ensure reliable updates and ACID compliance. Conditions (114B) may be stored in a non-relational database and may store a list of conditions to be executed by condition processor (116). Conditions (114B) may be stored in a non-relational (e.g., NoSQL) database due to the lack of defined scheme in defining rules. Finally, application storage (114A) may include one or more processing rules for handling individual network accounts of a user and may be stored in a non-relational or relational database. Data layer (114) may additionally include additional storage layers not illustrated such as mail storage (e.g., in a grid filesystem) and other storage layers for supporting a web interface.

Platform (102) includes a social graph monitor (110). In one embodiment, social graph monitor (110) comprises one or more processing devices (e.g., servers, serverless lambda functions, etc.) configured to issue periodic network requests to social networks (108A-108D). In one embodiment, social networks (108A-108D) provide application programming interfaces (APIs) for access data stored in social graphs associated with the social networks (108A-108D). Thus, social graph monitor (110) utilize a post extraction component (110A) to periodically issue requests to the social networks (108A-108D) (e.g., via a REST API or similar interface). Post extraction component (110A) may be configured to poll the social networks (108A-108D) periodically and aggregate social media posts in a social graph for further processing. In some embodiments, post extraction component (110A) may filter irrelevant data from the social graph (e.g., news postings, content not related to a user, etc.).

Post extraction component (110A) forwards the social media data to NLP processors (110B). In one embodiment, the social graph monitor (110) may include multiple NLP processors (110B) to perform natural language processing (NLP) in parallel. In one embodiment, NLP processors (110B) utilize sentiment analysis routines to classify a group of posts into one or more sentiments. In some embodiments, NLP processors (110B) may utilize one or more neural networks (or deep neural networks) to classify text within social media posts into one or more sentiments (e.g., expressing remorse, indicating a death, etc.). In one embodiment, the NLP processors (110B) may utilize a machine learning framework (e.g., TensorFlow) to train a plurality of machine learning models (e.g., using a deep learning architecture with long short-term memory units). In one embodiment, the NLP processors (110B) convert each post into a word vector for input into the machine learning modules and the output of NLP processors (110B) are sentiment scores for each post.

NLP processors (110B) transmits the scores for each post to a scorer component (110C). In one embodiment, scorer component (110C) aggregates the sentiments from each post into a single score for each sentiment. Thus, scorer component (110C) generates an array of sentiments and associated scores. Scorer component (110C) forwards these scores to alert generator (110D).

Alert generator (110D) analyzes the scores and filters out irrelevant scores. For example, alert generator (110D) may extract sentiments indicating that a user has passed away and may ignore other sentiments. If the sentiment array has a score above a predetermined threshold for a sentiment indicating a user has passed away, the alert generator (110D) generates one or more confirmatory alerts to confirm that the scorer component (110C) accurately predicted the sentiment (as described in more detail in the corresponding flow diagrams).

Upon receiving confirmation (e.g., via a lack of response from the user), the alert generator (110D) forwards a signal to crawler (110E) indicating that a sentiment has occurred (e.g., a user has passed away). In response, crawler (110E) may crawl public data sources as a final check to confirm that the sentiment is accurate. For example, crawler (110E) may query one or more third-party public data records sources to confirm the sentiment (e.g., by verifying a death record or similar record). Once the crawler (110E) confirms the sentiment, the social graph monitor (110) transmits a notification to condition processor indicating a transfer condition has occurred.

Condition processor (116) includes a rule processor (112). In one embodiment, the rule processor (112) acts as a gateway device for analyzing a transfer condition (e.g., the death of a user) and selecting the conditions to execute from condition storage (114B). For example, condition storage (114B) may store a list of conditions and associated actions to take based on that condition on a per-account basis. For example, condition storage (114B) may include a first rule stating that upon death, a first social media account should be archived and sent to a user. Condition storage (114B) may additionally include a rule that upon death, all mail should be forwarded to a recipient user. Rule processor (112) retrieves these rules based on the detected condition and triggers various components of the condition processor (116) as discussed below.

In a first embodiment, condition processor (116) includes a segmenter (116B) and an API handler (116A). In this embodiment, the segmenter (116B) retrieves one or more network accounts associated with a condition and issues on or more API calls to the network applications (106A-106D) to extract data and bundle the data for recipient users. In one embodiment, segmenter (116B) divides all network data from a network application (106A-106D) into discrete segments based on the condition. For example, the segmenter (116B) may extract all photos from a network application (106A-106D) and bundle this data for a first user while bundling all messages issued by the same application and bundle these messages for a second user.

In a second embodiment, condition processor (116) includes a mail forwarder (116D) and an API handler (116C). In one embodiment, API handler (116C) initiates password reset requests for network applications (106A-106D). In response, the network application (106A-106D) send password reset emails to, for example, mail server 120. Mail forwarder (116D) intercepts these emails and re-routes them to an email address identified in conditions storage (114B). Mail forwarder (116D) may additionally reroute all emails from a given network application (106A-106D) to the identified recipient, thus enabling them to reset a password and access an account.

In a third embodiment, condition processor (116) includes an account transfer manager (116E). In this embodiment, account transfer manager (116E) transfers complete control over a mail account hosted by mail server (120) to a designated recipient identified in conditions storage (114B).

In a fourth embodiment, condition processor (116) includes an account deletion manager (116F). In this embodiment, account deletion manager (116F) may be configured to access a network application (106A-106D) and delete a user account hosted by each of said applications. In one embodiment, account deletion manager (116F) may alternatively delete portions of the user content hosted by network applications (106A-106D).

In addition to the components above, the platform (102) additionally includes a web server (118). In one embodiment, web server (118) provide a web-based user interface for configuring network account parameters stored in application storage (114A) as well as conditions stored in conditions storage (114B). In one embodiment, web server (118) may comprise one or more front end web servers. Additionally, web server (118) may provide a web-based user interface for accessing electronic mail storage by mail server (120) (i.e., a webmail interface). Alternatively, or in conjunction with the foregoing, web server (118) may additionally comprise an API for providing similar features to a mobile email client.

Mail server (120) comprises a server to send and receive email messages from, for example, network applications (106A-106D) and client devices (104A-104D). In some embodiments, mail server (120) comprises a server device communicating via standard email protocols (e.g., SMTP, POP3, IMAP, etc.). In some embodiments, mail server (120) includes one or more API endpoints allowing for programmatic access to mail stored in the mail server (or data layer (114)) via web server (118). Mail server (120) additionally includes an autoresponder (120A). In one embodiment, autoresponder (120A) may be instructed by condition processor (116) to reply to all future email messages (after a transfer condition is detected) with a pre-defined email message (stored, for example, in data layer (114)).

The specific operations performed by the platform (102) are described more fully in the following descriptions of the flow diagrams, the description of which is incorporated herein by reference in its entirety.

Figure 2:
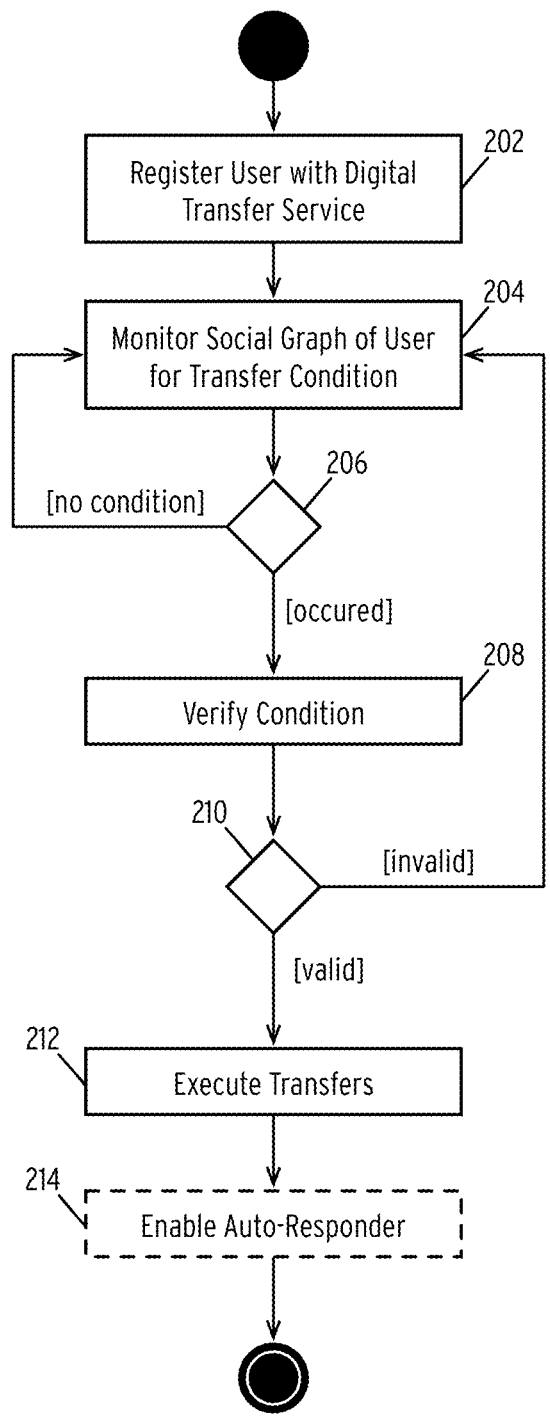
FIG. 2 is a flow diagram illustrating a method for automating network account transfers based on predicted inactivity according to some embodiments of the disclosure.

FIG. 2 is a flow diagram illustrating a method for automating network account transfers based on predicted inactivity according to some embodiments of the disclosure.

In step 202, the method registers a user with a digital transfer service.

As described above, a digital transfer service may comprise functionality and/or associated hardware included as a part of a mail platform. In this embodiment, a user may already have an account with the mail service and thus may not need to create an account with a digital transfer service.

Figure 3:
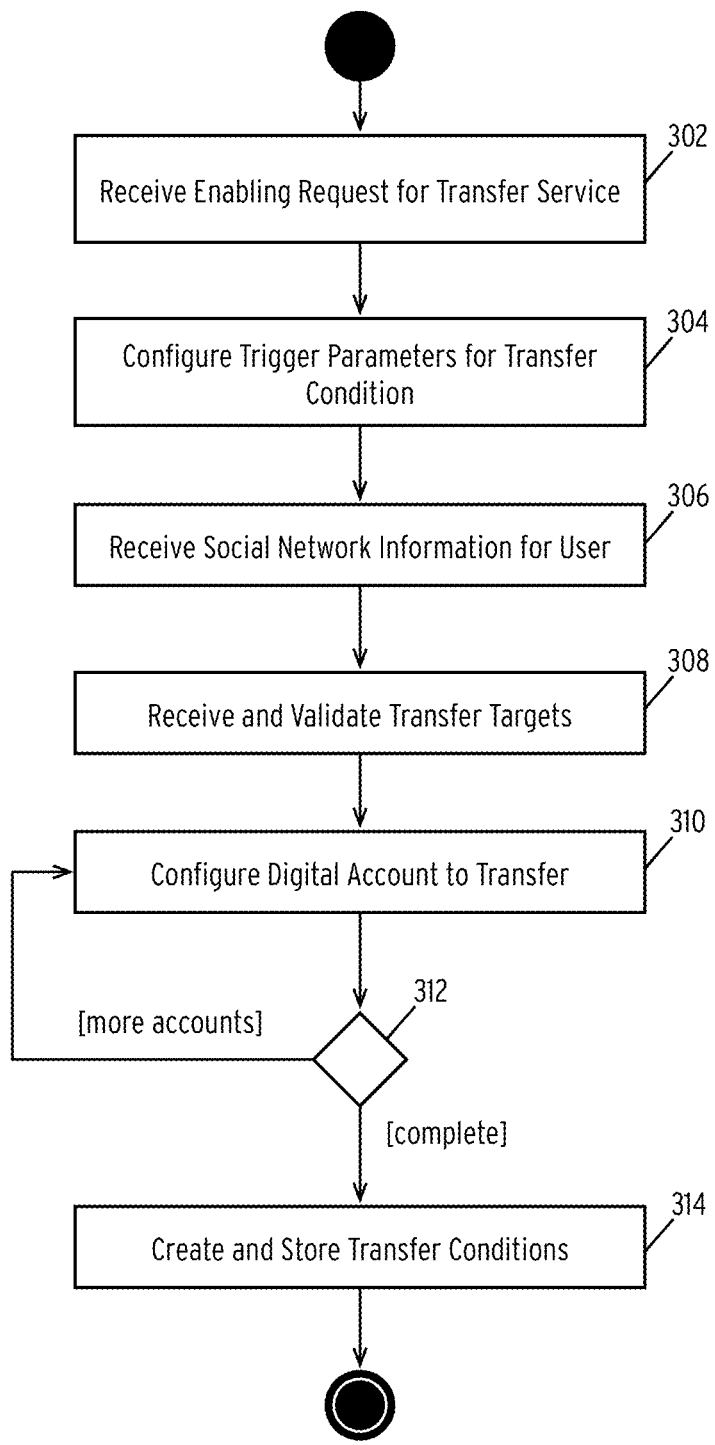
FIG. 3 is a flow diagram illustrating a method for creating and storing transfer conditions according to some embodiments of the disclosure.

Specific implementations of registering a user with a digital transfer service are described more fully in the description of FIG. 3 which is incorporated herein by reference. In general, a provider (e.g., a mail service) may provide an option to automate account transfers as part of the provider's services. Mail providers are particularly well equipped for providing this service since many, if not all, digital accounts are controlled (e.g., password resets, authentication, etc.) via email. That is, a user who controls an email address can control any digital account associated with that email address.

In one embodiment, the provider generates a user interface (UI) that enables the registering of a user with a digital transfer service. This UI allows users to submit digital transfer details such as account details, recipient details, transfer conditions, segmentation options, and various other parameters used to manage account transfers. Details of these options are described more fully throughout the disclosure.

In step 204, the method monitors a social graph of the user for a transfer condition.

In some embodiments, a social graph of a user comprises one or more social accounts of the user (e.g., FACEBOOK, TWITTER, etc.) and the connections between the user and other objects (e.g., other users, companies, products, "pages," etc.). In one embodiment, the method identifies a social graph based on known social accounts associated with the user. For example, a user may register the identity of various social account when signing up for the digital transfer service in step 202. In another embodiment, the method may have access to these accounts due to the user providing them when registering an account (e.g., via a mail provider).

Figure 4:
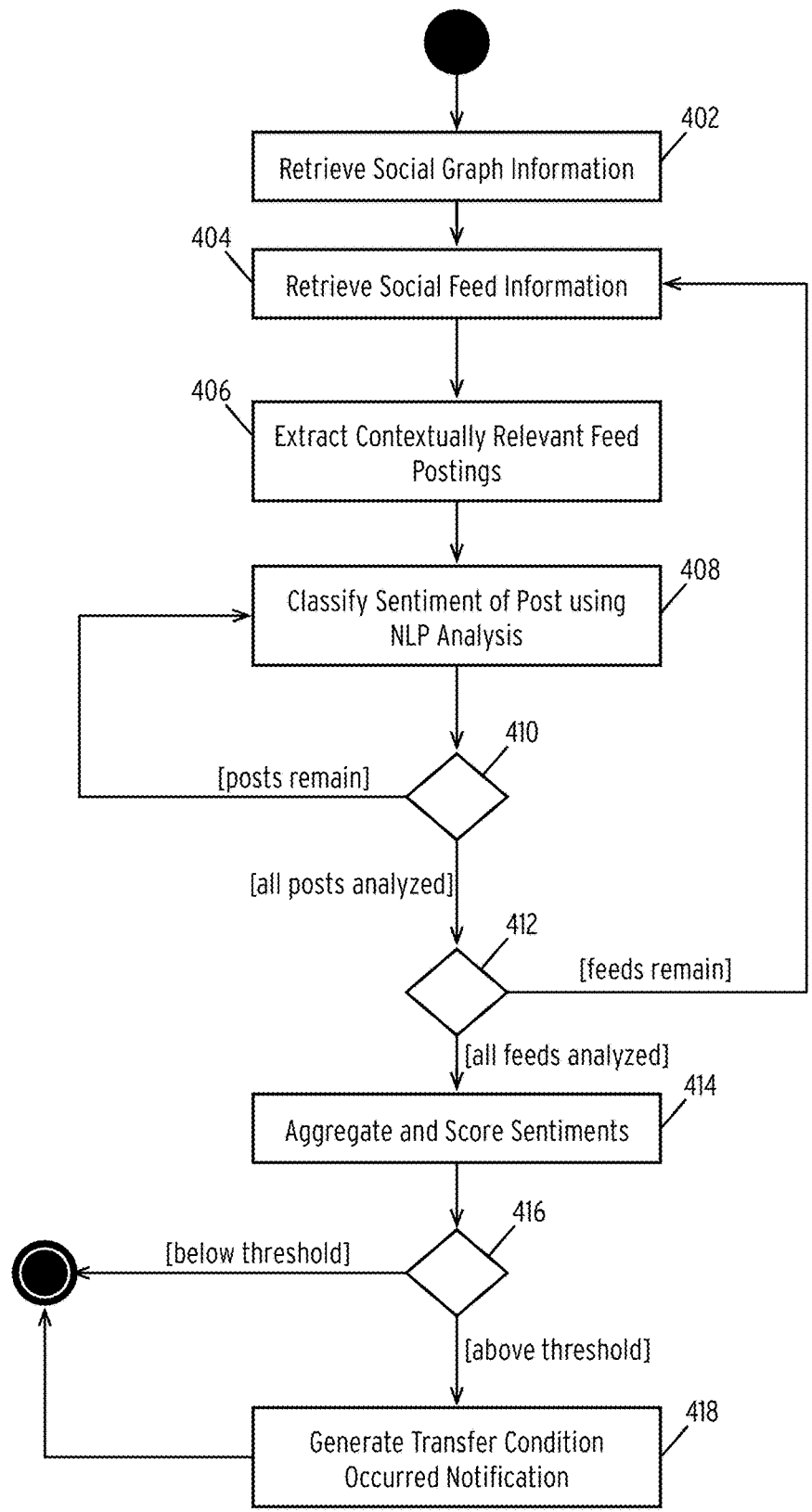
FIG. 4 is a flow diagram illustrating a method monitoring a social graph to identify a transfer condition according to some embodiments of the disclosure.

FIG. 4 describes specific techniques for monitoring a social graph of a user to determine if a transfer condition arises. In general, a transfer condition refers to a condition occurring within a social graph that indicates that one or more accounts (or portions of data managed by those accounts) should be automatically transferred to another user (i.e., a recipient identified in step 202).

As described above, current techniques for identifying when a transfer condition has occurred are technically lacking. The specific techniques for monitoring a social graph (including the use of sentiment analysis via natural language processing (NLP) techniques) significantly improve these current systems and reduce their error rates. In general, the method analyzes posts generated by friends (or others) of the user in the social graph and calculates a sentiment over a given period. As one example, many friends of the user may post social network updates expressing condolences or other sentiments reflecting that the user who registered in step 202 has passed away.

In step 206, the method determines if the transaction condition has occurred. If not, the method continues to monitor the social graph of the user in step 204.

In step 208, the method verifies the transfer condition after the method, in step 206, determines that transfer condition has occurred.

As described above, a transfer condition may correspond to the death of the user. Thus, the method implements an additional verification check to further protect against false positives. Specific embodiments of verifying a transfer condition are described more fully in the description of FIG. 5, which is incorporated herein by reference in its entirety. In general, the method may attempt to contact the user using various contact mechanisms and may also query public records to confirm whether the transfer condition has occurred.

In step 210, the method determines whether the transfer condition is valid after performing additional validation. If the transfer condition is not valid, the method continues to monitor the social graph of the user in step 204.

In step 212, the method executes transfers associated with transfer condition.

As will be described in more detail in the descriptions of FIGS. 6A through 6D, the method executes one or more transfers after detecting a transfer condition generated by social graph activity and verifying that the condition was validly met. In general, a transfer refers to a modification of a network asset.

In one embodiment, a transfer comprises a packaging of assets from a network account and the transfer of those assets to a recipient user identified by the owner of the network account. In some embodiments, this network account may comprise a remote server, and the method may retrieve the assets via an API (e.g., an HTTP API). In some embodiments, the method may additionally segment the data before delivering the data to the recipient user or users.

Alternatively, or in conjunction with the preceding, a transfer comprises enabling the automatic forwarding of emails. As discussed above, a mail provider may execute the method illustrated in FIG. 2. Since the mail account may be used as the contact information for a given network account, the transfer may comprise initiating a password reset at the network account (e.g., via an API or simulated/headless browser script). The method may forward the email to reset the password to the recipient, allowing them to control the network account.

Alternatively, or in conjunction with the preceding, a transfer may comprise switching the owner of the account triggering the transfer. As discussed above, a mail provider may execute the method, and transferring assets may comprise assigning a new user to a list of authorized users of the mail account of the user associated with the transfer condition.

Alternatively, or in conjunction with the preceding, a transfer may comprise deleting data associated with the user in one more network accounts. Alternatively, or in conjunction with the foregoing, the transfer may include deleting data associated with the user at a local service.

These and other embodiments are described more fully within and, in particular, in the description of FIGS. 6A through 6D.

In step 214, the method enables an auto-responder.

In one embodiment, as part of step 202, the user may create an automatic response message. This automatic response message may comprise a textual (plain or rich) message for transmittal after a given transfer condition occurs. In one embodiment, the automatic response message may be generated by a recipient (discussed above) after the recipient is given access to the user's account. For example, as one example, the auto-response message may comprise an epitaph for the user when the transfer condition is associated with the automatic detection of the user's passing. In some embodiments, the user may generate different auto-responses for different users (or groups of users).

After enabling the auto-responder, the email account associated with the user may continue to receive messages. For each message, the auto-responder may reply to the message with the auto-response message. In one embodiment, the method only replies once to a give email address. In other embodiments, the method may respond to every email regardless of the number of messages sent to a given sender.

FIG. 3 is a flow diagram illustrating a method for creating and storing transfer conditions according to some embodiments of the disclosure.

In step 302, the method receives an enabling request for a transfer service.

In one embodiment, the method may be implemented by a platform such as the platform illustrated in FIG. 1. In this embodiment, the method may be implemented using a custom user interface provided via a webmail application, account management page, or another interface. In one embodiment, the method may be performed primarily by a web server and data layer, as illustrated in FIG. 1.

In one embodiment, the enabling request comprises an HTTP request received from a client device indicating that a transfer service should be established for a given user account. In one embodiment, this account comprises a mail account administered by a platform.

In step 304, the method configures trigger parameters for a transfer condition.

In some embodiments, step 304 may be repeated for multiple transfer conditions. In one embodiment, a transfer condition comprises a condition whereby the platform should transfer network application resources to another user. In one embodiment, the transfer condition may comprise the death of the user issuing the request in step 302. Alternatively, or in conjunction with the foregoing, the transfer condition may comprise a level of inactivity of the user with respect to a given email account.

In one embodiment, trigger parameters may include options presented in a drop-down menu specifying the type of trigger (e.g., death, inactivity, etc.) The trigger parameters may also include a sensitivity threshold (e.g., a confidence that death has occurred, a period of inactivity, etc.). In one embodiment, trigger parameters may also include one or more transfer targets (e.g., an email address) associated with recipient users.

In step 306, the method receives social network information for the user issuing the request for a transfer service.

In some embodiments, these details may already be associated with the user as part of the normal operations of a user account (e.g., an email account). In other embodiments, the method may request that the user authenticate with a given social network account (e.g., via OAuth) to store credentials for accessing a social network account. In one embodiment, the method may execute step 306 for each social network account owned by a user. In some embodiments, the method may limit the types of social network accounts available based on the social network's features (e.g., the ability for users to "post" on a "wall" of the user). For example, the method may limit the social network accounts to a FACEBOOK, TWITTER, or LINKEDIN account.

In step 308, the method receives and validates transfer targets.

In one embodiment, a user may designate one or more recipients to receive network account data upon the triggering of a transfer condition via transfer targets (e.g., email, SMS, etc.). In step 308, the method attempts to validate these accounts. In one embodiment, a transfer target comprises an email account. In one scenario, the email account may be provided by the same platform as the email account of the requesting user. In this scenario, the method may confirm that the email account exists and is valid. In a second scenario, the transfer target may comprise an external email account. In this embodiment, the method may send a confirmation email to the transfer target and request that the account user validate the email address (e.g., by clicking a confirmation link).

In step 310, the method configures a digital account to transfer.

After setting up transfer conditions (e.g., detected death) and one or more transfer targets (e.g., recipients). The method allows a user to add one or more digital accounts. As used herein, a digital account refers to an account for a network service provided by a network application (e.g., network applications 106A-106E depicted in FIG. 1). In one embodiment, the method may first authenticate the user with the digital accounts (e.g., via OAuth or a similar protocol) to ensure they are the owner of the accounts. Next, the method may retrieve a listing of assets associated with the digital account (e.g., photos, postings, etc.).

Next, the method may provide a user interface to enable a user to select how each account and/or assets in an account are handled upon the occurrence of a transfer condition. In one embodiment, this may entail a user selecting a checkbox, or another UI element, indicating that ownership of the digital account should be transferred, in its entirety, to a validated recipient. Alternatively, or in conjunction with the foregoing, the method may allow a user to select some or all of the identified assets (or types of assets) to transfer to a validated recipient upon the occurrence of a transfer condition. Alternatively, or in conjunction with the foregoing, the method may allow the user to select an option that the digital account should be deleted upon the occurrence of the transfer condition.

Alternatively, or in conjunction with the foregoing, step 310 may further include storing digital account details for each account. In one embodiment, digital account details comprise details regarding the user's digital account such as a username, passwords, etc. In one embodiment, digital account details are encrypted and stored by the platform In step 312, the method continues to configure each digital account (step 310) until the user has entered all digital accounts.

In step 314, the method creates and stores transfer conditions associated with each digital account, the identified rules, and the identifier recipients.

In one embodiment, the method may store an array of rules stored as objects in a data store as illustrated below:

1. [
2. {account: 'FACEBOOK', recipient:'brother@example.com', rule:'auto transfer'},
3. {account: 'TWITTER', recipient:'sister@example.com', rule: 'segment', options:
4. ['photos', 'videos']},
5. {account: 'BIG BANK', recipient: 'wife@example.com', rule: 'archive'},
6. {account: 'EMAIL', recipient: 'wife@example.com', rule: 'transfer'}
7. {account: 'LINKEDIN', rule: 'delete'},
8. {account: 'BIG BANK', rule: 'close'}
9. ]

In the example above, a user has configured a first rule that the user's FACEBOOK account should be automatically transferred to a user's brother. As will be described, in executing this rule, the systems and method initiate a password reset request and forward the email to the identified recipient. This operation is discussed in more detail in FIG. 6C. In the second rule, the user indicates that portions of the user's TWITTER account (photos and videos) should be transfers (e.g., as an archive) to a user's sister. This operation is discussed in more detail in FIG. 6B. As a third rule, the user specifies that a bank account should be archived in its entirety and sent to a user's wife. This operation is discussed in more detail in FIG. 6B. Note that in the final rule, the user specifies that the same bank account should be closed or deleted. Likewise, the user specifies that a LINKEDIN account should be deleted. These deletion operations are discussed in more detail in FIG. 6A. In a fourth rule, the user specifies that the user's email account should be transferred to the user's wife. This operation is discussed in more detail in FIG. 6D.

FIG. 4 is a flow diagram illustrating a method monitoring a social graph to identify a transfer condition according to some embodiments of the disclosure. In the illustrated embodiment, a social graph monitor (as illustrated in element 110 of FIG. 1) may execute the described steps.

In step 402, the method retrieves social graph information.

In one embodiment, retrieving social graph information of a user comprises accessing a list of one or more social network accounts and identifying one or more defined API endpoints for access data stored by the social network. In one embodiment, the method may only utilize a subset of all API endpoints offered by a social network service (e.g., a "wall" API or "post" API).

In step 404, the method retrieves social feed information based on the social graph information.

In one embodiment, the method accesses one or more social network accounts of a user via an API provided by the social network. In one embodiment, using the API, the method retrieves a set of social media content items (e.g., posts). In one embodiment, the posts retrieved from the social network account comprise text-based posts. In one embodiment, these posts may comprise postings by other users on the "wall" of a user.

In step 406, the method extracts contextually relevant feed postings.

In previous step (404), the method extracts all data from one or more API endpoints of social network accounts. In some embodiments, this data may be "noisy" given a large number of irrelevant postings. For example, a user's wall on a social network may include various links to articles posted by other users. In this step, the method filters out irrelevant posts by analyzing the type of post (e.g., link versus comment) and identifying only those posts that are directly relevant to the transfer condition. For example, the method may use the social graph of a user to identify only those posts by "friends" of the user and then identify only those posts from friends that include textual comments (versus links to third-party content). Alternatively, or in conjunction with the foregoing, the method may identify those posts that explicitly reference the user or include various keywords (e.g., "RIP," "condolences," etc.).

In step 408, the method classifies a post using natural language processing (NLP) analysis.

After step 406, the method obtains a listing of posts by a user's friends or acquaintances that comprise textual comments posted regarding a user. In step 408, the method analyzes each post to generate a sentiment and a confidence score for each post. In one embodiment, the method may utilize a machine learning framework (e.g., TensorFlow) to train a plurality of machine learning models (e.g., using a deep learning architecture with long short-term memory units). In one embodiment, the method converts each post into a word vector for input into the machine learning modules, and the output of NLP algorithm are sentiment scores for each post.

In step 410, the method determines if any posts remain and if so, continues to process each remaining post using an NLP routing in step 408.

In step 412, after analyzing all posts for a given social feed (i.e., for a given social network), the method determines if any feeds or social network accounts need to be inspected. If so, the method re-executes steps 404, 406, 408, and 410 for each remaining feed.

In step 414, the method aggregates and scores sentiments generated in step 408.

After step 412, the method includes, for each social network, a list of sentiments and a score representing the confidence of the NLP routine in predicting the sentiment. In step 414, the method first combines these sentiments into a single array of sentiments and scores (e.g., an array of maps). In one embodiment, as a preprocessing step, the method may weight posts from given social networks higher than others. For example, FACEBOOK posts may be weighted higher than TWITTER posts given the more personal nature of the platform. The method may then aggregate each unique sentiment and average the sentiment score across each sentiment. The method may then identify the sentiment having the highest average score and choose this sentiment as a representative sentiment for a given point of time.

In some embodiments, the above method may be performed using a sliding "window" of time. That is, the method may execute every week and capture all social activity during the preceding week. In some embodiments, this window may be fine-tuned based on observed behavior. In other embodiments, the window may be tuned based on a machine learning routine which attempts to predict the window having the fewest false positives (described more in FIG. 5).

In step 416, the method determines if the sentiment score of the highest sentiment is above a pre-determined threshold.

In one embodiment, the sentiment score may be a decimal number between 0 and 1. In this case, a threshold may be set to 0.8 or higher depending on system needs. If the sentiment score is above the threshold, the method marks the sentiment as a valid predicted sentiment. In this case, the method generates a transfer condition occurred notification in step 418, and transmits this notification to, for example, a condition processor (such as condition processor 116 in FIG. 1). Alternatively, if the sentiment score is not above the pre-determined threshold, the method may end and re-execute at the appropriate time, based on the defined window.

Figure 5:
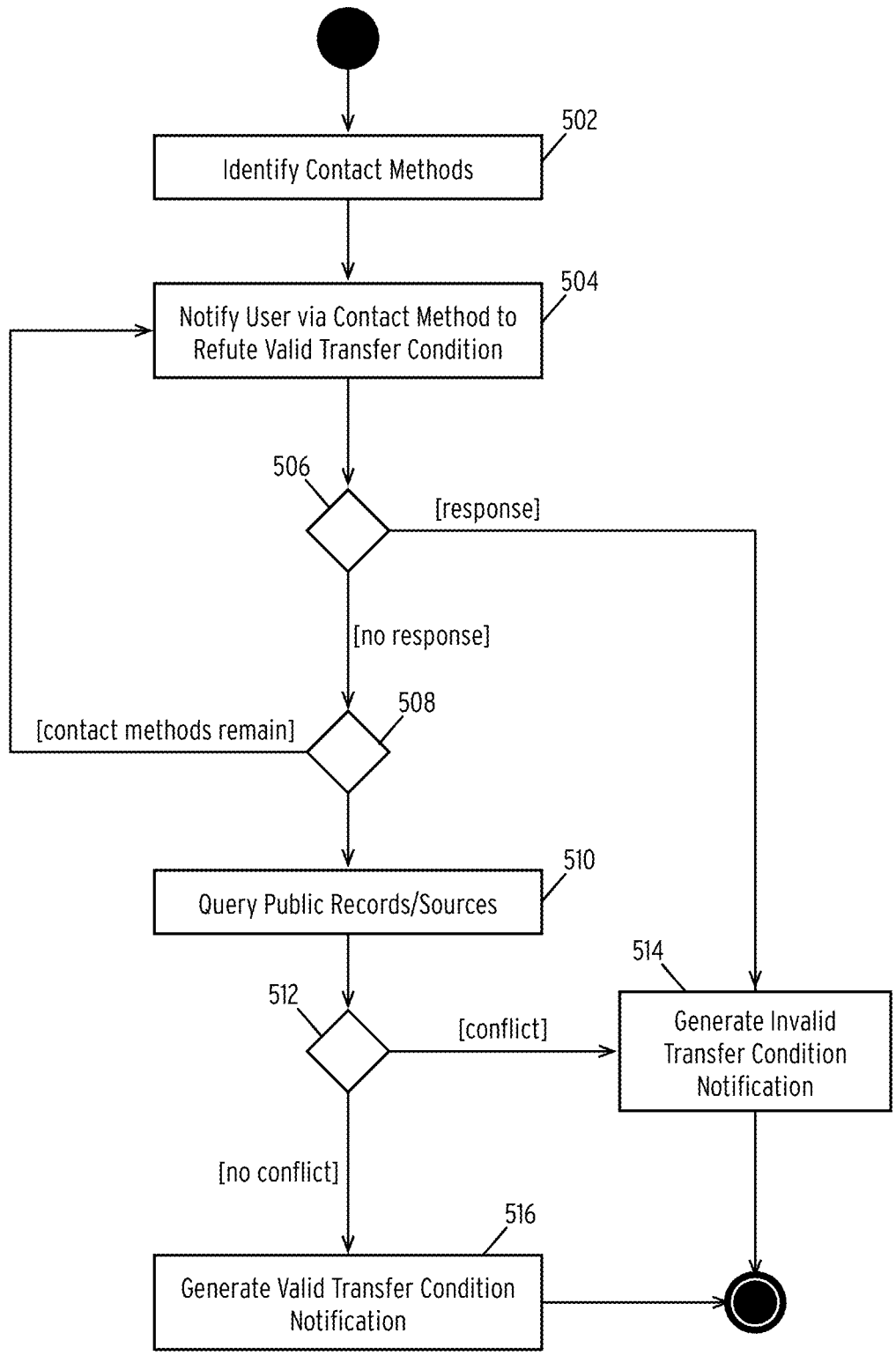
FIG. 5 is a flow diagram illustrating a method for validating a detected transfer condition according to some embodiments of the disclosure.

FIG. 5 is a flow diagram illustrating a method for validating a detected transfer condition according to some embodiments of the disclosure. In one embodiment, the method illustrated in FIG. 5 may be executed as part of a rule processor such as rule processor 112 in FIG. 1. In one embodiment, the method in FIG. 5 may be executed in response to a transfer condition occurred notification generated by the methods of FIG. 4.

In step 502, the method identifies contact methods associated with a user.

In one embodiment, contact methods may comprise email addresses, phone numbers, instant message identifies, social media account identifiers, or any other form of contact information for a user who has enabled the transfer service.

In some embodiments, the contact methods may also include the same contact methods for other users assigned by the user.

In step 504, the method notifies the user via a given contact method to refute a potentially valid transfer condition.

As described above, one type of transfer condition comprises a condition that a user has passed away. In this scenario, the method must implement additional controls to ensure that the results of the NLP routines did not generate a false positive. In this sense, FIG. 5 acts as a "backstop" for false positives and ensures an appropriate result. In some embodiments, after executing the method in FIG. 5, the results may be feed into NLP routines to enhance the prediction processes. That is, the previous word vectors may be reassigned to an indication that the previously detected sentiment is incorrect and used as training data.

Returning to step 504, the method transmits a notification to the user via, for example, a phone call, text message, email, etc. The notification may include a prompt allowing the user to refute the transfer condition. For example, an email may include a hyperlink for refuting the condition.

In step 506, if the user responds to the notification, the server generates an invalid transfer condition notification in step 514. In one embodiment, the notification in step 514 may cause the method to immediately cease further processing. For example, the notification may indicate that a user has not, in fact, passed away since they can respond to the message.

Alternatively, if the user fails to respond to a given contact method, the method, in step 508, continues to iterate through each contact method, attempting to contact the user through each contact method.

Finally, in step 508, the method may exhaust all contact methods and may proceed to a third quality control step.

In step 510, the method queries public records and sources to confirm the transfer condition.

In general, step 510 attempts to proactively determine if the transfer condition detected in FIG. 4 is valid. In some embodiments, steps 510 and 512 may be omitted. In some embodiments, the steps may be initial retained but omitted after enough training has been performed on the NLP processors.

In a first embodiment, in step 510, the method may scrape one or more public records databases. A public records database may comprise a governmental or quasi-governmental data sources that records, for example, deaths or individuals. Alternatively, the method may scrape known websites that post details regarding individuals. For example, the method may scrape a site that publishes obituaries.

In a second embodiment, the method may perform an Internet search using details of the user. For example, the method may search the Internet (using a search engine) for the user's name to identify any recent web pages addressing the user. Next, the method may classify the sentiment of those documents (in the same manner described previously) to determine if the recent web pages match the predicted sentiment.

In a third embodiment, the method may initiate communications with individuals associated with a user to confirm the transfer condition. Since the method has access to the user's social graph, the method may identify those users who frequently interact with the user and classify these users as close friends. The method may then transmit a message to those close friends to refute or confirm the transfer condition.

In some embodiments, all the above embodiments (or less than all) may be used in combination. In general, the number of confirmatory embodiments may be chosen based on the sensitivity of the system and how adequately the NLP processors are performing and may be refined or reduced over time.

In step 512, the method determines if a conflict between the transfer condition and the information retrieved in step 510 exists.

If a conflict exists, the method may generate an invalid transfer condition notification in step 514, as discussed previously. If a conflict does not exist, the method generates a valid transfer condition notification and may transmit this to one or more processing steps described more fully in the description of FIGS. 6A-6D.

In one embodiment, a conflict refers to a document or response that conflicts with the transfer condition. For example, if the transfer condition indicates a user has passed away and a recent webpage includes an interview with the user after the transfer condition occurred, this is a potential conflict. Alternatively, if a friend of the user refutes the transfer condition, this is a potentially clear conflict. Similarly, if the method detects an obituary for the user, this may be an even clearer conflict.

As can be seen, conflicts may not be immediately clear. Thus, the method may aggregate conflicts and only identify a conflict when the number of conflicts exceeds a predetermined threshold. For example, if a threshold is three and the method identifies an obituary, receives a notification from a friend that the user has passed away, and identifies a public death record, the condition is satisfied. Alternatively, if the method only receives a response from a (potentially mean-spirited) friend that the user has passed away the method may not detect a conflict.

Notably, in each step of FIG. 5, the method may forward the transfer condition to a team of reviewers to manually determine whether the transfer condition is valid. In this case, the method may detect that the transfer condition is irreconcilable and thus requires manual intervention. The manual acts undertaken by reviewers are not described in detail to the extent that such acts are not technical steps.

Figure 6A:
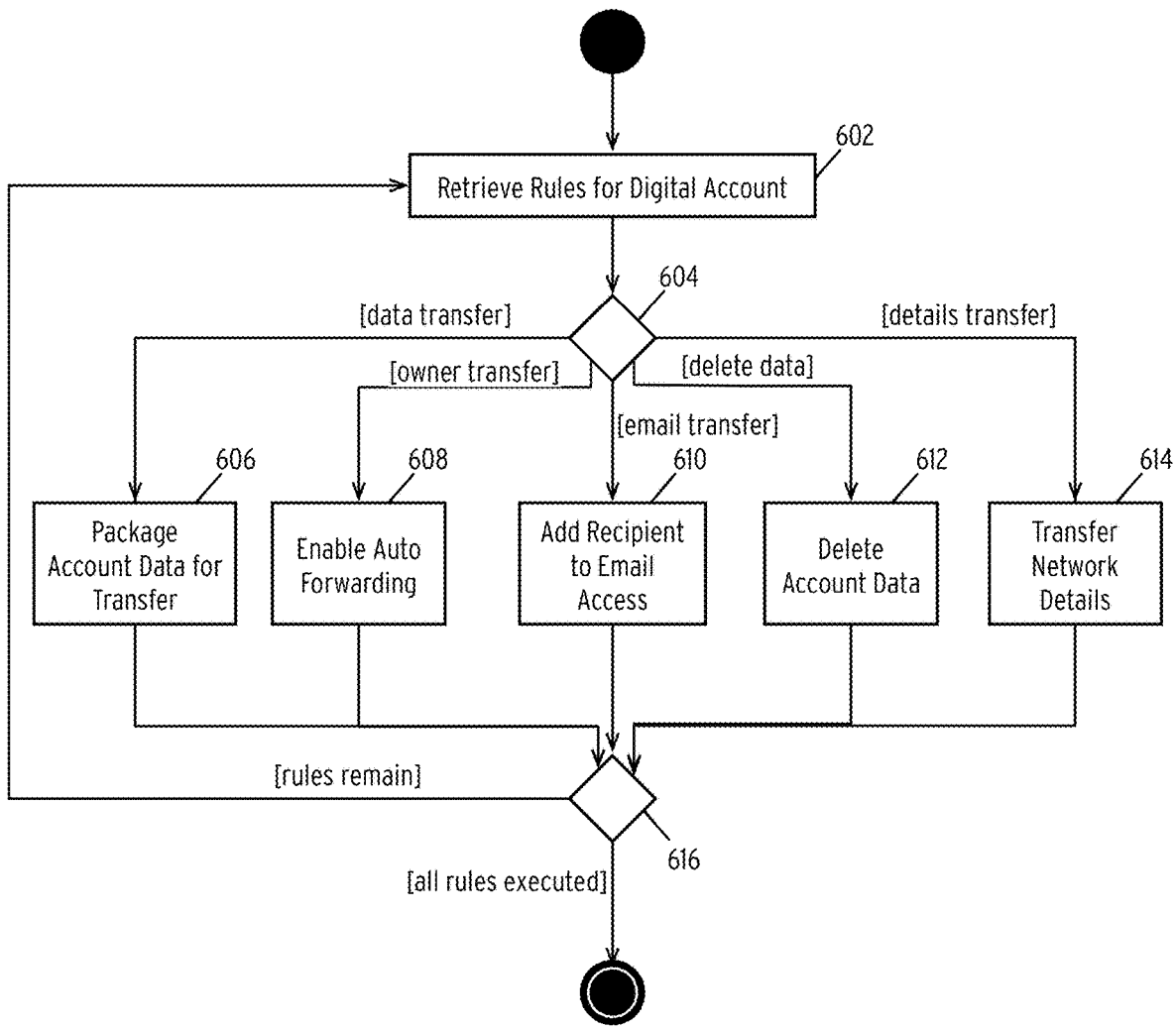
FIG. 6A is a flow diagram illustrating a method for executing a transfer of a network account according to some embodiments of the disclosure.

FIG. 6A is a flow diagram illustrating a method for executing a transfer of a network account according to some embodiments of the disclosure.

In one embodiment, the methods discussed in connection with FIGS. 6A through 6D may be performed by various components of a condition processor such as condition processor 116 of FIG. 1.

In step 602, the method retrieves rules for a digital account associated with a user.

As described previously, rules may be stored in storage device (e.g., a data layer) of a platform service. Rules are described in the description of step 314, the disclosure of which is incorporated herein by reference. In one embodiment, the method retrieves all rules generated in the method of FIG. 3 corresponding to a given transfer condition.

In step 604, the method identifies the type of processing required by the rule.

Figure 6B:
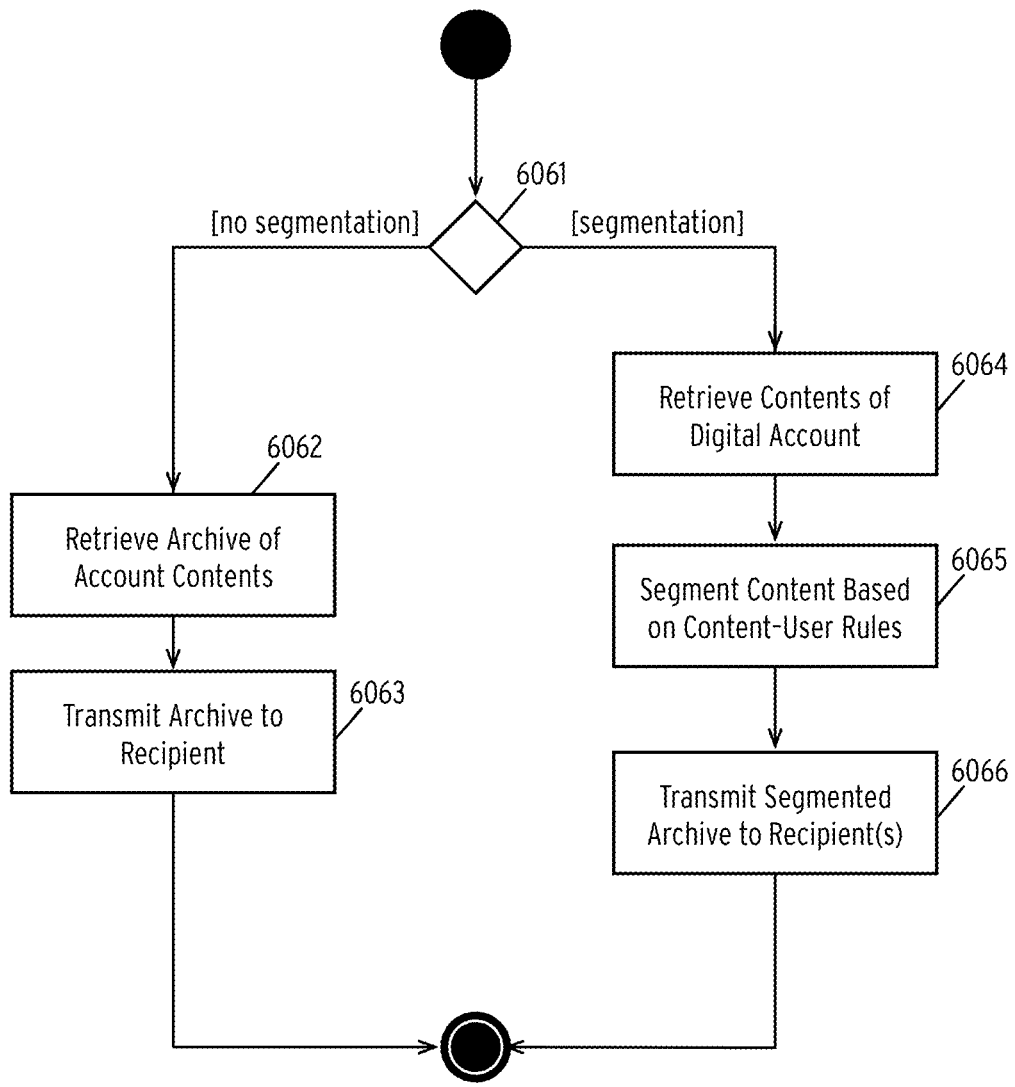
FIG. 6B is a flow diagram illustrating a method for packaging network account data for transfer according to some embodiments of the disclosure.

In one embodiment, the method packages account data for transfer in step 606, which is disclosed more fully in the description of FIG. 6B.

Figure 6C:
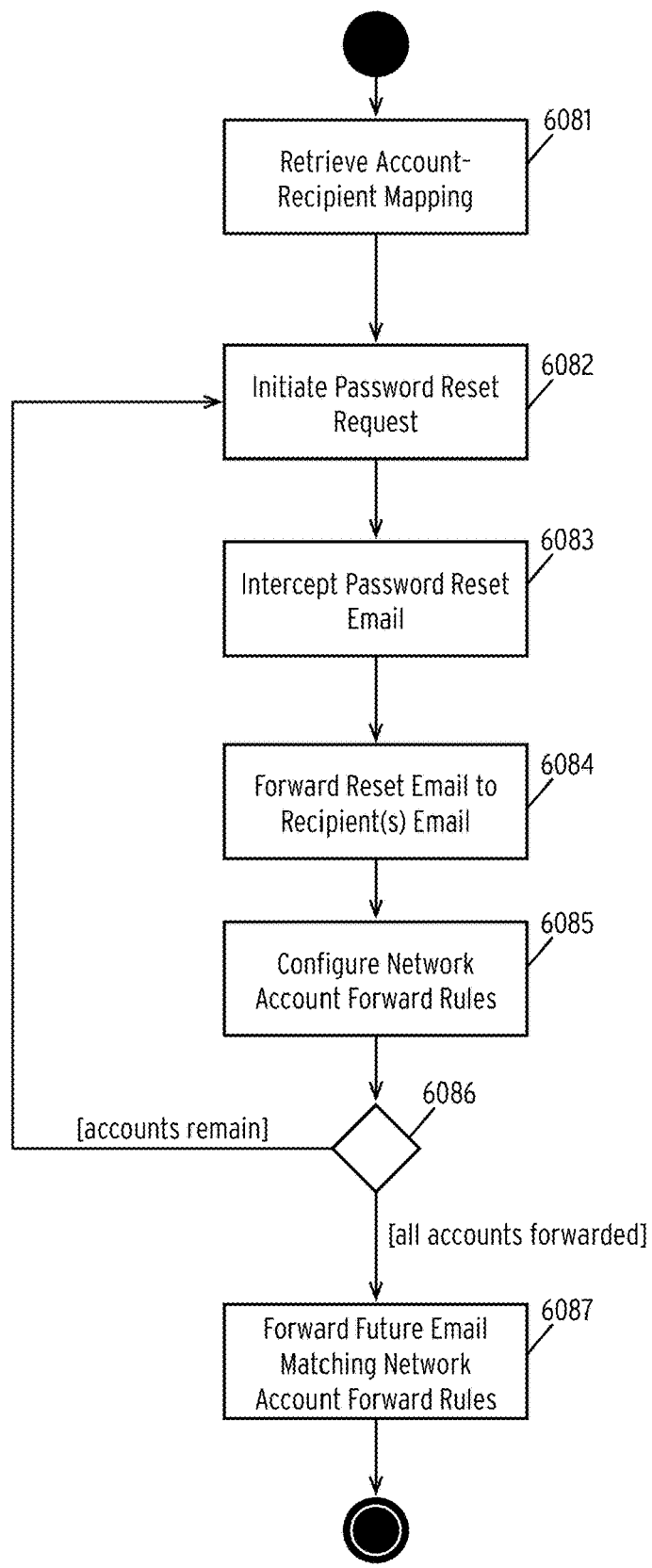
FIG. 6C is a flow diagram illustrating a method for enabling auto-forwarding of a network account according to some embodiments of the disclosure.

In another embodiment, the method enables auto-forwarding of account reset emails and follow up emails in step 608, which is disclosed more fully in the description of FIG. 6C.

In another embodiment, the method adds an identified recipient to an email access list in step 610, which is disclosed more fully in the description of FIG. 6B.

In another embodiment, the method may delete account data associated with a network account of a user in step 612. In this step, the method identifies the account identified in the rule retrieved in step 602. This account is associated with a network application that provides one or more internal or external APIs. In step 612, the method issues an API request that instructs the network application to delete the user's account with the network application.

In another embodiment, the method may transfer network details from the user's account to a recipient user in step 614. As described above in FIG. 3, a user may store account details for various network accounts. In this embodiment, the method may identify a listing of accounts with digital account details (e.g., usernames, passwords, account numbers, etc.) and an identified recipient, or recipients, for each account. In one embodiment, the method may decrypt the digital account details and transmit the decrypted account details to an identified recipient (e.g., via an email or via a text message). In an alternative embodiment, the method may send a notification to the recipient allowing the recipient to view the digital account details via a user interface (e.g., a web application).

In step 616, the method determines if any rules remain and executes one or more of steps 606, 608, 610, 612, and 614 for each remaining rule. Alternatively, if all rules have been processed, the method ends.

Note that FIGS. 6A through 6D describe exemplary transfer operations (steps 606, 608, 610, 612,614) and other types of transfer operations may be utilized that generally either affect a network application or transfer ownership of the network application to a recipient user.

FIG. 6B is a flow diagram illustrating a method for packaging network account data for transfer according to some embodiments of the disclosure.

In step 6061, the method initially determines whether the rule include a segmentation request. As described previously, users may direct the entire contents of a network application's assets to a single individual or portions of the assets to specific individuals.

In steps 6062 and 6063, the method processes a non-segmented transfer rule.

In step 6062, the method retrieves an archive of the account contents.

In one embodiment, step 6062 comprises issuing a network request to an API of a network application requesting all data associated with the user's account at the network application. In some embodiments, this may comprise a single network request or multiple network requests. In general, the data returned in response to these requests is a plurality of content items or text strings. The method may parse this returned data (including making any additional network requests for images or other content incorporated by external URL) and package the returned data into a single archive (e.g., ZIP or TAR file). Alternatively, the method may store the data and provide a web-based interactive file viewer for retrieving the assets.

In step 6063, the method transmits the archive to a recipient.

In one embodiment, step 6063 comprises emailing the recipient (or recipients) a copy of the archive generated in step 6062. Alternatively, or in conjunction with the foregoing, step 6063 may comprise transmitting a link to a web application for viewing the contents of the archive.

If the rule indicates that network application content should be segmented, the method retrieves the contents of a digital account in step 6064. In one embodiment, this may be performed similarly to the process in step 6062. However, in step 6064, the method may only identify a specific subset of content in the API requests to access the content.

In step 6065, the method segments the content based on content-to-user rules.

In some embodiments, step 6064 may only enable a high-level segmentation of content (e.g., all photos), whereas the rules may allow for finer-grained segmentation (e.g., specific photo albums). In this embodiment, the method further segments the returned content as necessary until the specific segment of content identified in a rule is identified and segmented.

In step 6066, the method transmits the segmented archive to the recipient(s). This step may be performed in the same fashion as described in the description of step 6063, the disclosure of which is incorporated herein by reference in its entirety.

FIG. 6C is a flow diagram illustrating a method for enabling auto-forwarding of a network account according to some embodiments of the disclosure.

In step 6081, the method retrieves an account-to-recipient mapping. As described above, a user may specify that a given network application account be transferred to a specific recipient upon the detection of a transfer condition. In this step, the method retrieves this mapping from a data layer.

In step 6082, the method initiates a password reset request.

In one embodiment, the method may initiate the reset request by calling an API method provided by the associated network application. In another embodiment, the method may execute a headless browser routine to simulate the act of a user clicking on a "Reset Password" link or similar link. In another embodiment, the method may store a list of URLs associated with a reset password function and issue an HTTP request to that URL. In each case, the network application sends a password reset email to the email address associated with the user.

In step 6083, the method intercepts the password reset email.

In one embodiment, the method may utilize a customized mail server to detect password reset emails as they arrive at a platform. In this case, the method may utilize a set of text-processing rules (e.g., an ANTLR grammar, etc.) to filter out password reset emails. In another embodiment, the method may periodically poll the user's mailbox after initiating the password reset request and identify the password request using similar text-processing rules.

In step 6084, the method forwards the email to a recipient(s) email(s).

As described above, a given recipient is associated with an email address. In step 6084, the method forwards the email to this address. In other embodiments, the method may generate an alternative form of notification. For example, the method may extract the password reset link from the email and transmit that link to a user via SMS, instant message, or any other mechanism.

In step 6085, the method configures network account forwarding rules.

In one embodiment, a network account forward rule comprises a rule that forwards any emails from a given network account to the recipient identified in step 6061.

In one embodiment, the method may set up these forwarding rules immediately. In another embodiment, the method may await a password reset confirmation email from the network account before enabling forwarding. In some embodiments, the method may use both approaches depending on how a network application handles password resets.

In an alternative embodiment, steps 6084 and 6085 may be implemented via an intermediary webpage. In this case, the link forwarded to a user in step 6084 may direct the user to a webpage provided by a platform. In this case, that webpage may include the link to a password reset function of a network account. In this scenario, the webpage may include tracking code to determine when and if a user visits the page which may trigger step 6085.

In step 6086, the method determines if any accounts remain to be transferred in the rule and re-executes steps 6082, 6083, 6084, and 6085 for each remaining account.

If all accounts have been processed, the method forwards all future email matching the network account forward rules configured in step 6085 to the identified recipients. Forwarding network account emails may be performed like that described in the forwarding procedures in step 6084, the disclosure of which is incorporated herein by reference in its entirety.

Figure 6D:
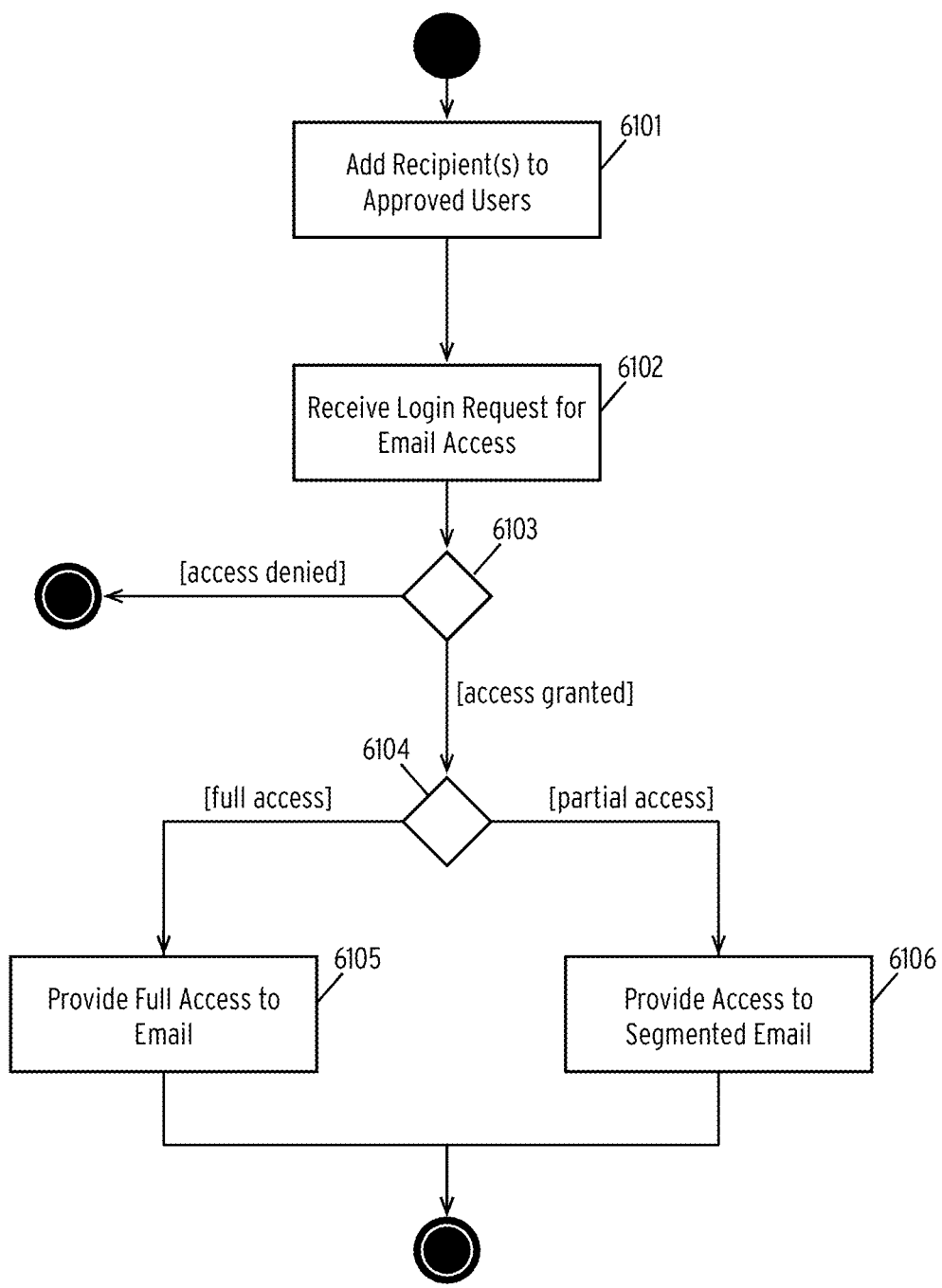
FIG. 6D is a flow diagram illustrating a method for adding a recipient to an email account according to some embodiments of the disclosure.

FIG. 6D is a flow diagram illustrating a method for adding a recipient to an email account according to some embodiments of the disclosure.

In step 6101, the method adds recipients identified in a rule to a list of approved users.

In the illustrated embodiment, the approved users comprise a list of accounts admitted access to a user's email account. In some embodiments, these recipient accounts must be hosted by the same email platform providing the user's email. In some embodiments, the listing may additionally include read and write permissions that control whether users may read emails, write and send emails, or perform both actions.

In step 6102, the method receives a login request for email access from a third-party and determines, in step 6103, whether the credentials received are on the list of approved users. If the login attempt is from an unauthorized user, the method ends.

Alternatively, if an authorized user executes the login attempt, the method first determines whether the user is given full or partial access to the email account in step 6104.

As described above, access may be granted on a full or partial basis. In one embodiment, a recipient may have access to every part of a user's email account. In another embodiment, a recipient may only be granted access to certain folders, certain time ranges, or certain senders.

If the recipient is granted full access, the method provides full access to the user's email account in step 6085. In one embodiment, this comprises allowing the recipient to access a webmail or mobile application interface allowing the user to access the user's mail (subject to read/write limitations).

If the recipient is granted segmented access, the method provides access to a segmented view of the email account in step 6086. In one embodiment, this may comprise gating any API or HTTP requests for the user's email to a specific subset of available email content.

Figure 7:
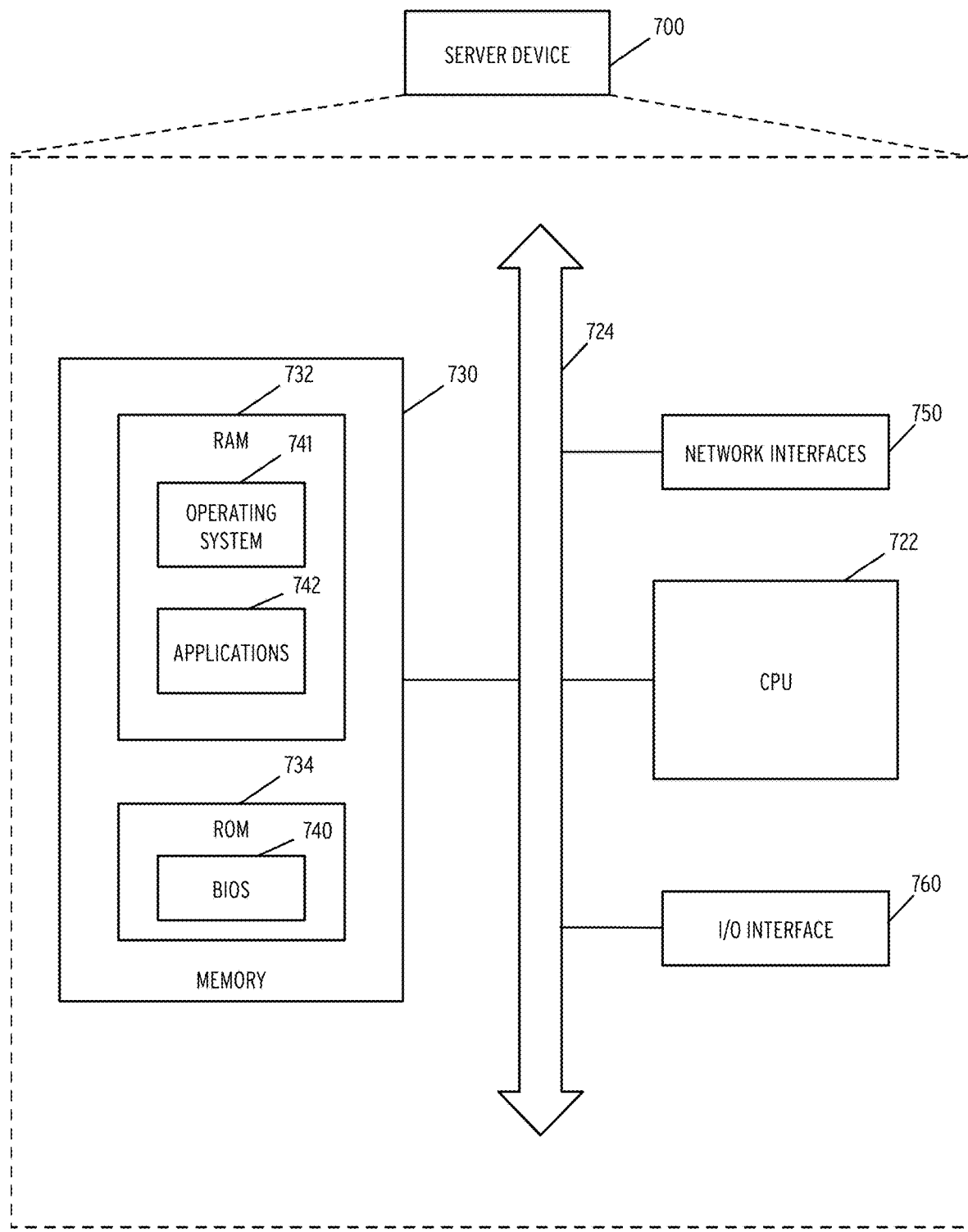
FIG. 7 is a hardware diagram illustrating a server device for automating network account transfers based on predicted inactivity according to some embodiments of the disclosure.

FIG. 7 is a hardware diagram illustrating a server device for automating network account transfers based on predicted inactivity according to some embodiments of the disclosure.

Server device (700) may include many more or fewer components than those shown in FIG. 7. However, the components shown are sufficient to disclose an illustrative embodiment for implementing the present disclosure. Server device (700) may represent, for example, the platform discussed above in relation to FIG. 1 in an embodiment where all components are situated in a single device.

As shown in FIG. 7, server device (700) includes a processing unit (CPU) (722) in communication with a mass memory (730) via a bus (724). Server device (700) also includes one or more network interfaces (750), and an input/output interface (760).

Server device (700) may optionally communicate with a base station (not shown), or directly with another computing device. Network interface (750) includes circuitry for coupling server device (700) to one or more networks, and is constructed for use with one or more communication protocols and technologies. Network interface (750) is sometimes known as a transceiver, transceiving device, or network interface card (NIC).

Server device (700) also comprises input/output interface (760) for communicating with external devices, such as external storage, or other input or devices not shown in FIG. 7. Input/output interface (760) can utilize one or more communication technologies, such as USB, infrared, Bluetooth™, or the like.

Mass memory (730) includes a RAM (732), a ROM (734), and other storage means. Mass memory (730) illustrates another example of computer storage media for storage of information such as computer-readable instructions, data structures, program modules or other data. Mass memory (730) stores a basic input/output system ("BIOS") (740) for controlling low-level operation of server device (700). The mass memory also stores an operating system (741) for controlling the operation of server device (700). It will be appreciated that this component may include a general-purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory (730) further includes one or more data stores, which can be utilized by server device (700) to store, among other things, applications (742) and/or other data. For example, data stores may be employed to store information that describes various capabilities of server device (700). The information may then be provided to another device based on any of a variety of events, including being sent as part of a header during a communication, sent upon request, or the like. At least a portion of the capability information may also be stored on a disk drive or other storage medium (not shown) within server device (700).

Applications (742) may include computer executable instructions which, when executed by server device (700), perform the functions social graph monitor (110), condition processor (116), mail server (120), and web server (118) and provide the functionality described in the preceding embodiments disclosed in FIGS. 1-6.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A system comprising:
 a mail server providing access to an email account of a user;
 a social graph monitor configured to:
  periodically query, over a network, a social graph associated with the user to retrieve at least one social network feed associated with the user,
  calculate a sentiment score for the social network feed based on parsing the social network feed using a natural language parser, and
  determine that a transfer condition has occurred if the sentiment score exceeds a pre-defined sentiment score threshold; and
 a condition processor configured to:
  transmit, via the mail server, a password reset request to a network application associated with the transfer condition,
  intercept an email from the network application, via the mail server, transmitted in response to the password reset request,
  forward, via the mail server, the email to a recipient associated with the transfer condition,
  determine that the recipient has reset a password associated with the network application, and
  forward, to the recipient via the mail server, subsequent emails from the network application.

2. A method comprising:
   periodically querying, via a mail server, over a network, a social graph associated with a user to retrieve at least one social network feed associated with the user;
   calculating, via the mail server, a sentiment score for the social network feed based on parsing the social network feed using a natural language parser;
   determining, via the mail server, that a transfer condition has occurred if the sentiment score exceeds a pre-defined sentiment score threshold;
   verifying, via the mail server, that the transfer condition is a valid condition;
   retrieving, via the mail server, a set of transfer rules associated with the user and the transfer condition, each transfer rule associated with a recipient user and a network application used by the user and including one or more instructions defining operations to execute regarding the respective network application; and
   executing, via the mail server, a transfer for each of the transfer rules, the executing a transfer comprising rerouting communications from the network application associated with the transfer rule to the recipient user, the rerouting performed by executing the operations in the transfer rules using an application programming interface of the network applications.

3. The method of claim 2, the periodically querying a social graph further comprising retrieving one or more posts from a social network feed and filtering the one or more posts based on an identity of a posting user.

4. The method of claim 3, the calculating a sentiment score further comprising:
   converting a post of the one or more posts into a word vector;
   transmitting the word vector for each of the one or more posts to the natural language parser; and
   generating a sentiment score for the post based on the outputs of the natural language parser.

5. The method of claim 4, the natural language parser comprising a neural network or deep neural network.

6. The method of claim 2, the verifying that the transfer condition is a valid condition comprising:
   transmitting a notification to the user via a contact method associated with the user; and
   identifying the transfer condition as invalid upon receiving a response to the notification.

7. The method of claim 2, the executing a transfer for each of the transfer rules comprises transmitting a set of digital account details to the recipient user, the digital account details comprising account details stored by the network application.

8. The method of claim 2, further comprising enabling an auto-responder in response to verifying that the transfer condition is a valid condition.

9. The method of claim 2, the executing a transfer for each of the transfer rules further comprising:
   retrieving one or more assets associated with a network account included in the transfer rule via an API;
   segmenting the one or more assets based on a list of recipients and asset types included within the transfer rule; and
   transmitting the segmented assets to each recipient in the list of recipients.

10. The method of claim 2, the executing a transfer for each of the transfer rules further comprising:
    transmitting a password reset request to a network application associated with the transfer condition;
    intercepting an email from the network application transmitted in response to the password reset request;
    forwarding the email to the recipient user associated with the transfer condition;
    determining that the recipient user has reset a password associated with the network application; and
    forwarding, to the recipient user, subsequent emails from the network application.

11. The method of claim 2, the executing a transfer for each of the transfer rules further comprising granting access to the user's email account to the recipient user.

12. A mail server comprising:
    a processor; and
    a non-transitory computer-readable storage medium for tangibly storing thereon program logic for execution by the processor, the stored program logic comprising:
      logic for periodically querying, over a network, a social graph associated with a user to retrieve at least one social network feed associated with the user;
      logic for calculating a sentiment score for the social network feed based on parsing the social network feed using a natural language parser;
      logic for determining that a transfer condition has occurred if the sentiment score exceeds a pre-defined sentiment score threshold;
      logic for verifying that the transfer condition is a valid condition;
      logic for retrieving a set of transfer rules associated with the user and the transfer condition, each transfer rule associated with a recipient user and a network application used by the user and including one or more instructions defining operations to execute regarding the respective network application; and
      logic for executing a transfer for each of the transfer rules, executing a transfer comprises rerouting communications from the network application associated with the transfer rule to the recipient user, the rerouting performed by executing the operations in the transfer rules using an application programming interface of the network applications.

13. The mail server of claim 12, the logic for periodically querying a social graph further comprising logic for retrieving one or more posts from a social network feed and filtering the one or more posts based on an identity of a posting user.

14. The mail server of claim 13, the logic for calculating a sentiment score further comprising:
    logic for converting a post of the one or more posts into a word vector;
    logic for transmitting the word vector for each of the one or more posts to the natural language parser; and
    logic for generating a sentiment score for the post based on the outputs of the natural language parser.

15. The mail server of claim 14, the natural language parser comprising a neural network or deep neural network.

16. The mail server of claim 12, the logic for verifying that the transfer condition is a valid condition further comprising:
    logic for transmitting a notification to the user via a contact method associated with the user; and
    logic for identifying the transfer condition as invalid upon receiving a response to the notification.

17. The mail server of claim 12, the executing a transfer for each of the transfer rules comprises transmitting a set of digital account details to the recipient user, the digital account details comprising account details stored by the network application.

18. The mail server of claim 12, the logic for executing a transfer for each of the transfer rules further comprising:
- logic for retrieving one or more assets associated with a network account included in the transfer rule via an API;
- logic for segmenting the one or more assets based on a list of recipients and asset types included within the transfer rule; and
- logic for transmitting the segmented assets to each recipient in the list of recipients.

19. The mail server of claim 12, the logic for executing a transfer for each of the transfer rules further comprising:
- logic for transmitting a password reset request to a network application associated with the transfer condition;
- logic for intercepting an email from the network application transmitted in response to the password reset request;
- logic for forwarding the email to the recipient user associated with the transfer condition;
- logic for determining that the recipient user has reset a password associated with the network application; and
- logic for forwarding, to the recipient user, subsequent emails from the network application.

20. The mail server of claim 12, the logic for executing a transfer for each of the transfer rules further comprising logic for granting access to the user's email account to the recipient user.

* * * * *